(12) United States Patent
Imanishi

(10) Patent No.: US 10,156,269 B2
(45) Date of Patent: Dec. 18, 2018

(54) CLUTCH DEVICE FOR MOTORCYCLE

(71) Applicant: EXEDY Corporation, Neyagawa-shi, Osaka (JP)

(72) Inventor: Yoshio Imanishi, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 178 days.

(21) Appl. No.: 15/338,580

(22) Filed: Oct. 31, 2016

(65) Prior Publication Data

US 2017/0159724 A1    Jun. 8, 2017

(30) Foreign Application Priority Data

Dec. 4, 2015  (JP) ................................ 2015-238002

(51) Int. Cl.
| | |
|---|---|
| *F16D 13/56* | (2006.01) |
| *F16D 43/21* | (2006.01) |
| *B62M 25/02* | (2006.01) |
| *F16D 23/12* | (2006.01) |

(52) U.S. Cl.
CPC ........... *F16D 13/56* (2013.01); *F16D 43/216* (2013.01); *B62M 25/02* (2013.01); *F16D 2013/565* (2013.01); *F16D 2023/123* (2013.01)

(58) Field of Classification Search
CPC .... F16D 13/52; F16D 13/56; F16D 2013/565; F16D 23/12; F16D 2023/123; F16D 43/216

See application file for complete search history.

(56) References Cited

U.S. PATENT DOCUMENTS

| | | | | |
|---|---|---|---|---|
| 8,151,964 | B2* | 4/2012 | Suzuta | ..................... F16D 13/52 |
| | | | | 192/54.5 |
| 8,448,770 | B2* | 5/2013 | Gokan | ..................... F16D 13/56 |
| | | | | 192/54.5 |
| 2017/0159725 | A1* | 6/2017 | Imanishi | ................. F16D 13/52 |

FOREIGN PATENT DOCUMENTS

JP           4907642 B2      4/2012

* cited by examiner

*Primary Examiner* — Richard M Lorence
(74) *Attorney, Agent, or Firm* — United IP Counselors, LLC

(57) ABSTRACT

A clutch center includes a pressure receiving part and is accommodated inside a clutch housing. A pressure plate includes a pressure applying part disposed at an interval from the pressure receiving part in an axial direction. A clutch portion is disposed between the pressure receiving part and the pressure applying part, and allows and blocks transmission of a power between the clutch housing and the clutch center. A first cam portion is disposed on one side of the clutch center in the axial direction, and increases an engaging force of the clutch portion when a forward drive force acts on a clutch device. A second cam portion is disposed on the other side of the clutch center in the axial direction, and reduces the engaging force of the clutch portion when a reverse drive force acts on the clutch device.

10 Claims, 6 Drawing Sheets

CLUTCH DEVICE FOR MOTORCYCLE

CROSS-REFERENCE TO RELATED APPLICATIONS

This application claims priority to Japanese Patent Application No. 2015-238002 filed on Dec. 4, 2015, the entirety of which is hereby incorporated by reference in its entirety.

BACKGROUND

Technical Field

The present disclosure relates to a clutch device for a motorcycle.

Background Information

In general, motorcycles (a two-wheeled motorcycle, a buggy, etc.) use a clutch device for allowing or blocking transmission of power from an engine to a transmission. The clutch device includes a clutch housing, a clutch center, a clutch portion and a pressure plate. The clutch housing is coupled to an engine crankshaft side. The clutch center is coupled to a transmission side. The clutch portion is disposed between the clutch housing and the clutch center and is configured to allow and block transmission of power. The pressure plate is configured to press the clutch portion.

A clutch device described in Publication of Japan Patent No. 4907642 has been proposed as this type of clutch device. The clutch device includes a cam mechanism disposed between the clutch center and the pressure plate. When a forward drive force acts on the cam mechanism from a driven gear, the cam mechanism is configured to increase the magnitude of clutch engaging force. On the other hand, when a reverse drive force acts on the cam mechanism from a main shaft, the cam mechanism is configured to reduce the magnitude of clutch engaging force.

In the clutch device described in Publication of Japan Patent No. 4907642, the cam mechanism includes a first cam member and a second cam member. The first cam member is herein fixed to the clutch center and includes protruded cams. On the other hand, the second cam member is fixed to the pressure plate, and includes recessed cams into which the protruded cams of the first cam member are respectively inserted.

Now in the clutch device described in Publication of Japan Patent No. 4907642, the first and second cam members, composing the cam mechanism, are provided separately from the clutch center and the pressure plate. To reduce the number of components and to lower manufacturing cost, it is assumed to provide the clutch center and the pressure plate integrally with these cam members. However, each of the protruded cams of the first cam member is required to be provided with first and second contact surfaces that tilt in parallel to each other with respect to a circumferential direction. Hence, when the first cam member is formed integrally with either the clutch center or the pressure plate to be formed by die casting, holes are possibly produced in root parts of the protruded cams due to a pull direction of a die.

FIG. 1 schematically shows the aforementioned situation. In FIG. 1, a clutch center or a pressure plate 2 is integrally provided with protruded cams 1 composing the first cam member. As described above, each of the protruded cams 1 is required to be provided with first and second contact surfaces 1a and 1b that tilt in parallel to each other with respect to the circumferential direction. In general, either the clutch center or the pressure plate 2 is formed by die casting. Therefore, in forming the protruded cams 1 on either the clutch center or the pressure plate 2, use of a first die is required to form the first contact surfaces 1a of the protruded cams 1, whereas use of a second die is required to form the second contact surfaces 1b of the protruded cams 1. Additionally, in order to pull the second die, formation of holes 2a is required in part of the clutch center or part of the pressure plate 2 (i.e., the root parts of the second contact surfaces 1b of the protruded cams 1).

However, either the clutch center or the pressure plate 2, when partially provided with holes, degrades in stiffness due to its construction as an annular member. Therefore, it is required to take a countermeasure such as increase in thickness of the other part of either the clutch center or the pressure plate 2. This results in a drawback of increase in weight of either the clutch center or the pressure plate 2.

SUMMARY

It is an object of the present disclosure to achieve reduction in number of components without degrading stiffness of either a clutch center or a pressure plate in a clutch device for a motorcycle, which includes a cam mechanism configured to achieve increase in clutch engaging force when a forward drive force acts thereon and to achieve reduction in clutch engaging force when a reverse drive force acts thereon.

(1) A clutch device for a motorcycle according to an aspect of the present disclosure includes a clutch housing, a clutch center, a pressure plate, a clutch portion, a first cam portion and a second cam portion. The clutch center includes a pressure receiving part and is accommodated inside the clutch housing. The pressure plate includes a pressure applying part that is disposed at an interval from the pressure receiving part in an axial direction. The clutch portion is disposed between the pressure receiving part and the pressure applying part and is configured to allow and block transmission of a power between the clutch housing and the clutch center. The first cam portion is disposed on one side of the clutch center in the axial direction, and is configured to increase an engaging force of the clutch portion when a forward drive force acts on the clutch device. The second cam portion is disposed on the other side of the clutch center in the axial direction and is configured to reduce the engaging force of the clutch portion when a reverse drive force acts on the clutch device.

In this device, a torque inputted into the clutch housing is transmitted to the pressure plate and the clutch center through the clutch portion, and is outputted therefrom. At this time, i.e., when a forward drive force acts on the pressure plate, the engaging force of the clutch portion is configured to be increased by the action of the first cam portion. On the other hand, when a reverse drive force acts on the clutch center, a reverse torque is configured to be transmitted therefrom through the second cam portion. In this case, the engaging force of the clutch portion is configured to be reduced by the action of the second cam portion.

Here, the first and second cam portions are disposed in different positions while the clutch center is interposed therebetween. With this construction, even when each of the first and second cam portions is made in the form of a slope and is integrated with a member (the pressure plate, the clutch center, etc.), the member (the pressure plate, the clutch center, etc.) can be formed with a single die. Therefore, each member (the pressure plate, the clutch center, etc.) can be formed in the shape of a continuous ring without holes, and degradation in stiffness of each member can be avoided.

(2) The first cam portion may include the clutch center and a first rotational member that is disposed on a first side of the clutch center in the axial direction in opposition to the clutch center and is configured to be rotatable relatively to the clutch center. On the other hand, the second cam portion may include the clutch center and a second rotational member that is disposed on a second side of the clutch center in the axial direction in opposition to the clutch center and is configured to be rotatable relatively to the clutch center. Moreover, the first rotational member and the second rotational member may be separately provided.

(3) The first rotational member and the second rotational member may be fixed so as to be non-rotatable relatively to each other and be immovable relatively to each other in the axial direction.

(4) The pressure plate may be disposed between the clutch housing and the clutch center in the axial direction. Additionally, the clutch device may further include a lifter member. The lifter member is disposed in opposition to the clutch housing while the pressure plate and the clutch center are interposed between the lifter member and the clutch housing. Also, the lifter member is fixed to the pressure plate. Moreover, the first cam portion may be provided between the clutch center and the lifter member. On the other hand, the second cam portion may be provided between the clutch center and the pressure plate.

(5) The first cam portion may be configured to move the pressure plate through the lifter member in the axial direction such that the pressure applying part of the pressure plate approaches to the pressure receiving part of the clutch center when the pressure plate is rotated relatively to the clutch center in a first rotational direction. On the other hand, the second cam portion may be configured to move the pressure plate in the axial direction such that the pressure applying part of the pressure plate separates from the pressure receiving part of the clutch center when the pressure plate is rotated relatively to the clutch center in a second rotational direction.

(6) The lifter member may be provided with a first protrusion. The first protrusion is integrated with the lifter member and protrudes toward the clutch center. Additionally, the first cam portion may include a first cam surface. The first cam surface is provided on an end surface of the first protrusion in a circumferential direction and tilts with respect to the circumferential direction.

(7) The first cam portion may include a first slope. The first slope is provided on the clutch center. The first slope tilts in parallel to the first cam surface with respect to the circumferential direction and makes contact with the first cam surface.

(8) The pressure plate may be provided with a second protrusion. The second protrusion is integrated with the pressure plate and protrudes toward the clutch center. Additionally, the second cam portion may include a second cam surface. The second cam surface is provided on an end surface of the second protrusion in the circumferential direction and tilts with respect to the circumferential direction.

(9) The second cam portion may include a second slope. The second slope is provided on the clutch center. The second slope tilts in parallel to the second cam surface with respect to the circumferential direction and makes contact with the second cam surface.

(10) The second protrusion may be exposed at an inner peripheral surface thereof through an inner peripheral surface of the second slope of the clutch center to a further inner peripheral side than the inner peripheral surface of the second slope of the clutch center. Additionally, the lifter member may be provided with a positioning part. The positioning part protrudes toward the clutch center and makes contact at an outer peripheral surface thereof with the inner peripheral surface of the second protrusion so as to enable positioning of the lifter member in a radial direction.

Here, radial positioning of the lifter member is enabled by utilizing the first protrusion composing the first cam portion. Therefore, positioning of a constituent member is easily enabled with a simple construction.

(11) The clutch portion may include a plurality of clutch plates configured to be pressed against each other. Additionally, the clutch device may further include an urging member for pressing the plurality of clutch plates against each other. Moreover, the lifter member may be a release member coupled to a release mechanism for releasing a pressure applied by the urging member.

(12) A clutch device for a motorcycle according to another aspect of the present disclosure includes a clutch housing, a clutch center, a pressure plate, a clutch portion, a first cam portion and a second cam portion. The clutch center includes a pressure receiving part and is accommodated inside the clutch housing. The pressure plate includes a pressure applying part that is disposed at an interval from the pressure receiving part in an axial direction. The clutch portion is disposed between the pressure receiving part and the pressure applying part, and is configured to allow and block transmission of a power between the clutch housing and the clutch center. The first cam portion is configured to increase an engaging force of the clutch portion when a forward drive force acts on the clutch center and the pressure plate. The second cam portion is configured to reduce the engaging force of the clutch portion when a reverse drive force acts on the clutch center and the pressure plate.

Overall, according to the present disclosure as described above, reduction in number of components can be achieved without degrading stiffness of a member (a clutch center, a pressure plate, etc) in a clutch device for a motorcycle, which includes cam portions configured to increase or reduce a clutch engaging force.

BRIEF DESCRIPTION OF THE DRAWINGS

Referring now to the attached drawings which form a part of this original disclosure.

DETAILED DESCRIPTION OF EMBODIMENTS

Entire Construction

Figure 1:
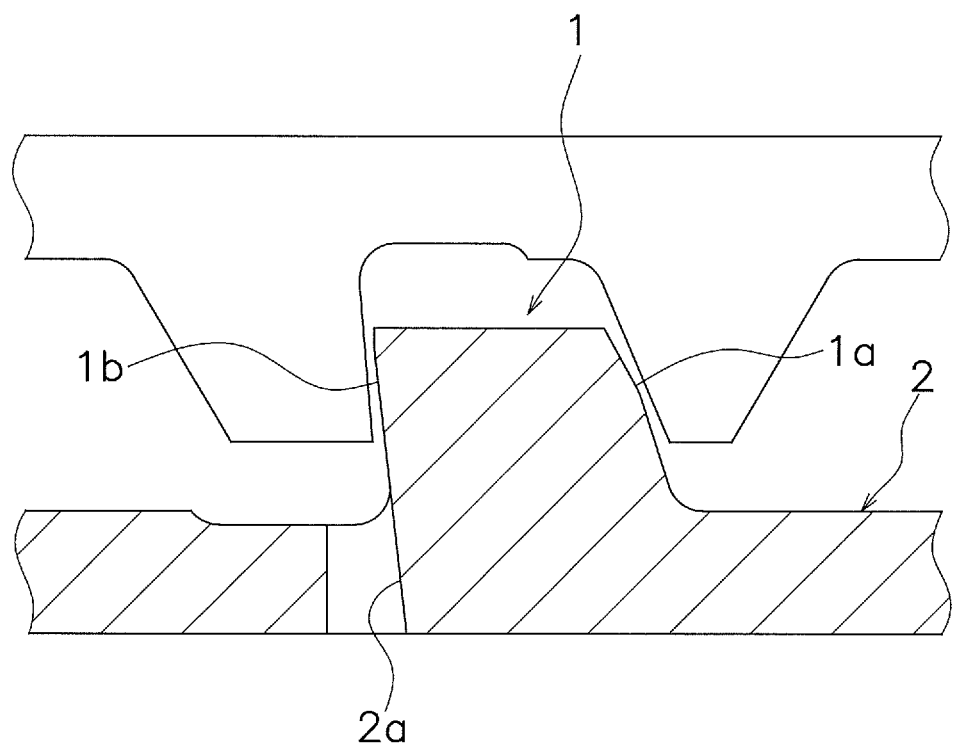
FIG. 1 is a schematic diagram for explaining an object to be achieved by the present disclosure.
Figure 2:
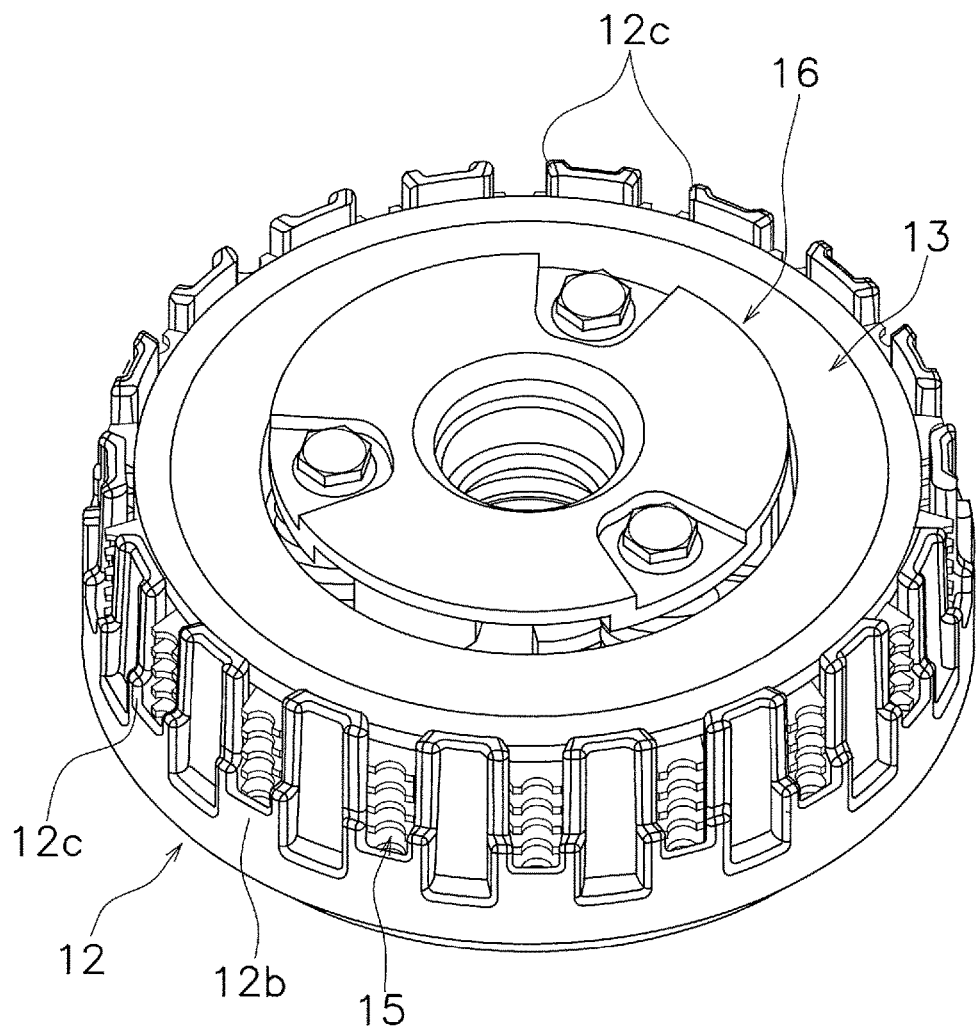
FIG. 2 is an external perspective view of a clutch device according to a preferred embodiment of the present disclosure.
Figure 3:
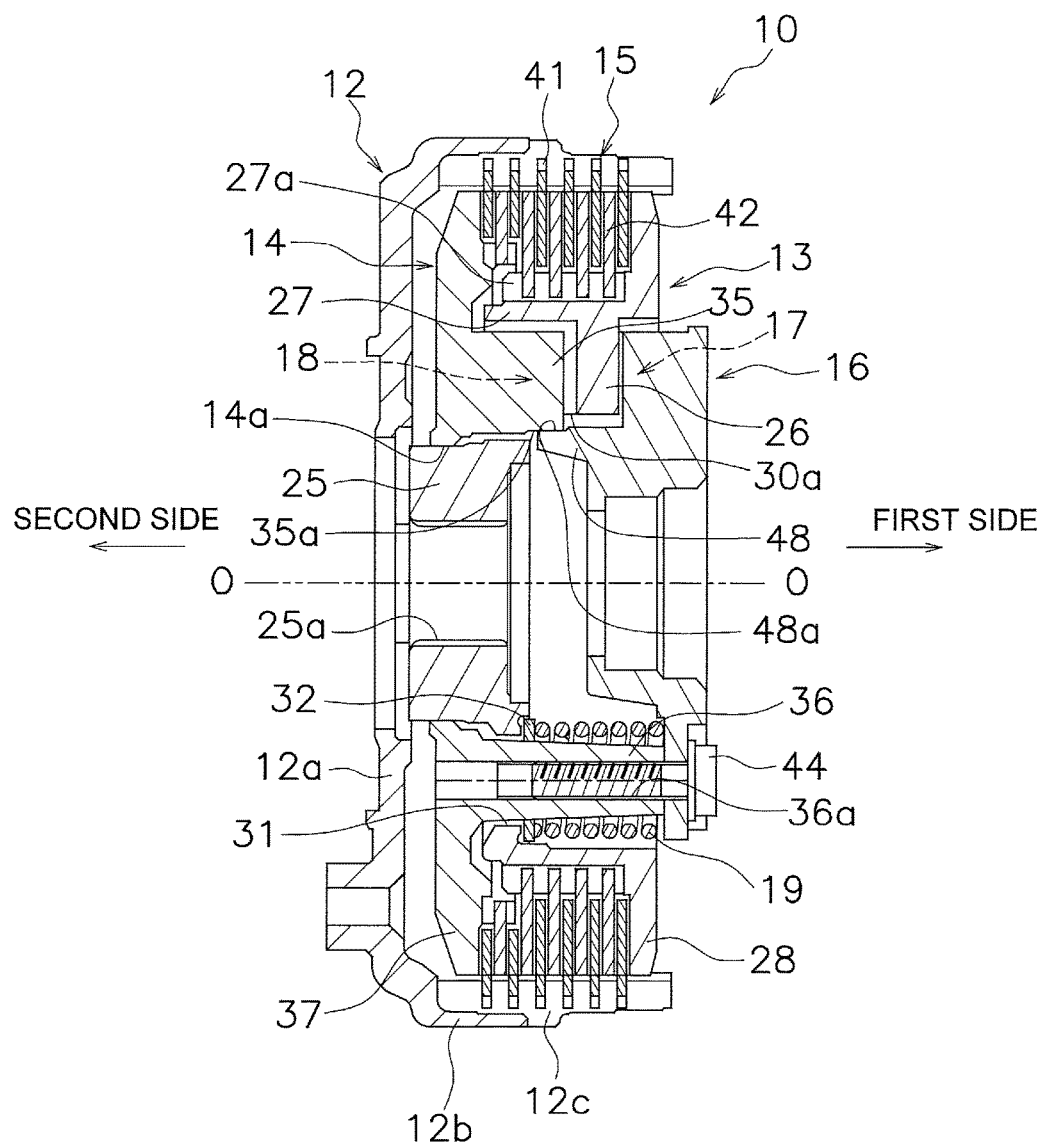
FIG. 3 is a cross-sectional view of the clutch device.
Figure 4:
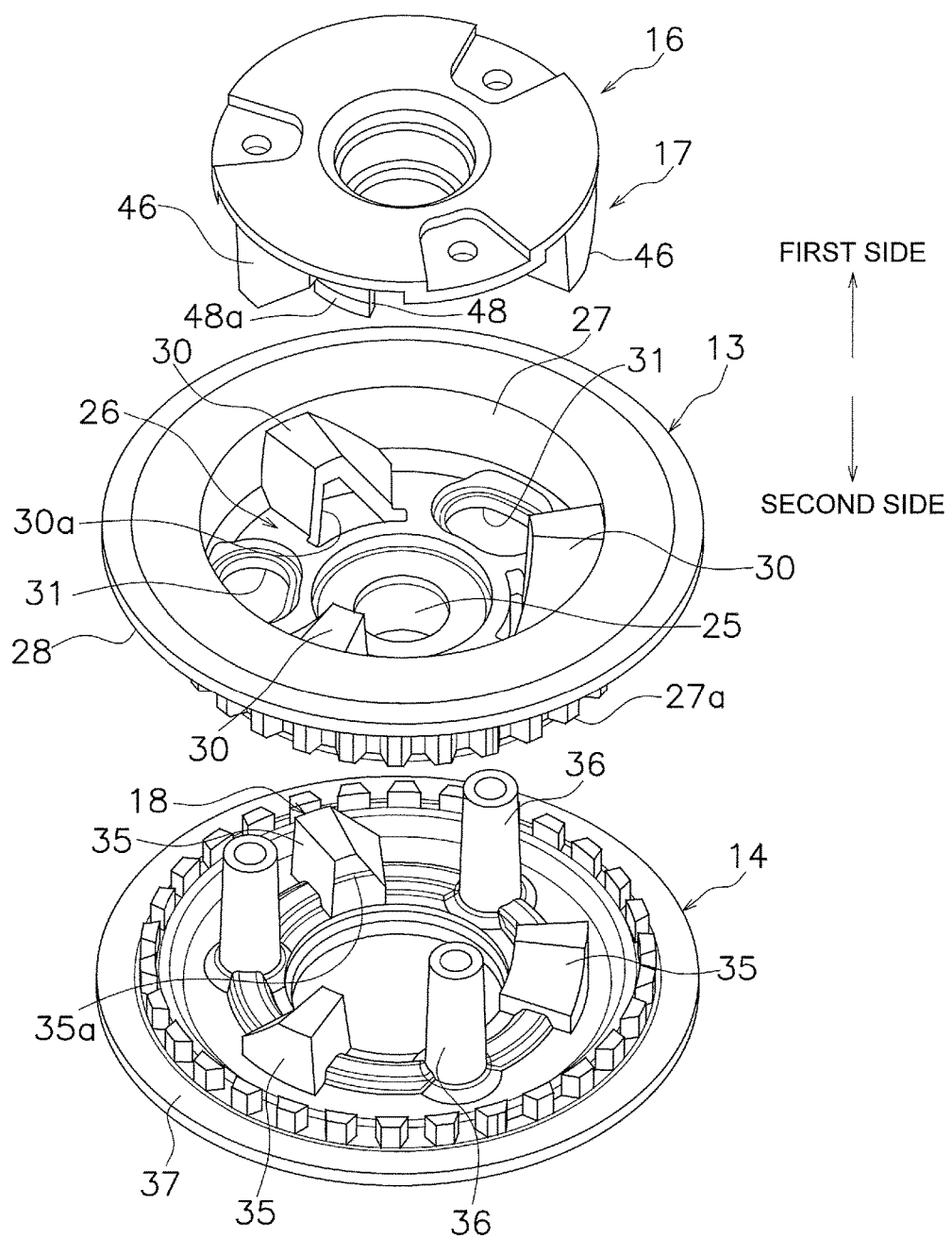
FIG. 4 is an exploded perspective view of major members composing the clutch device.
Figure 5:
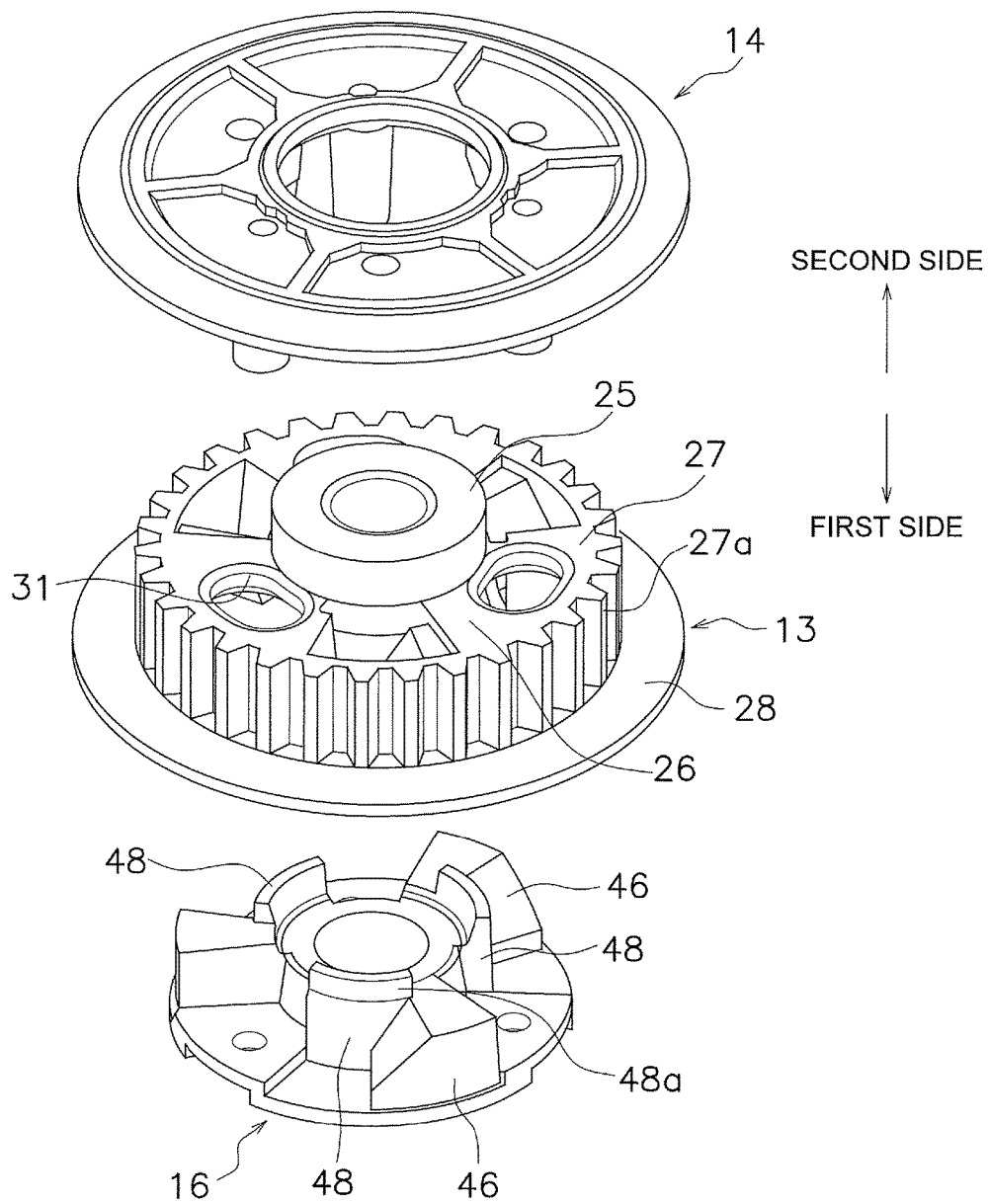
FIG. 5 is an exploded perspective view of the major members composing the clutch device.
Figure 6:
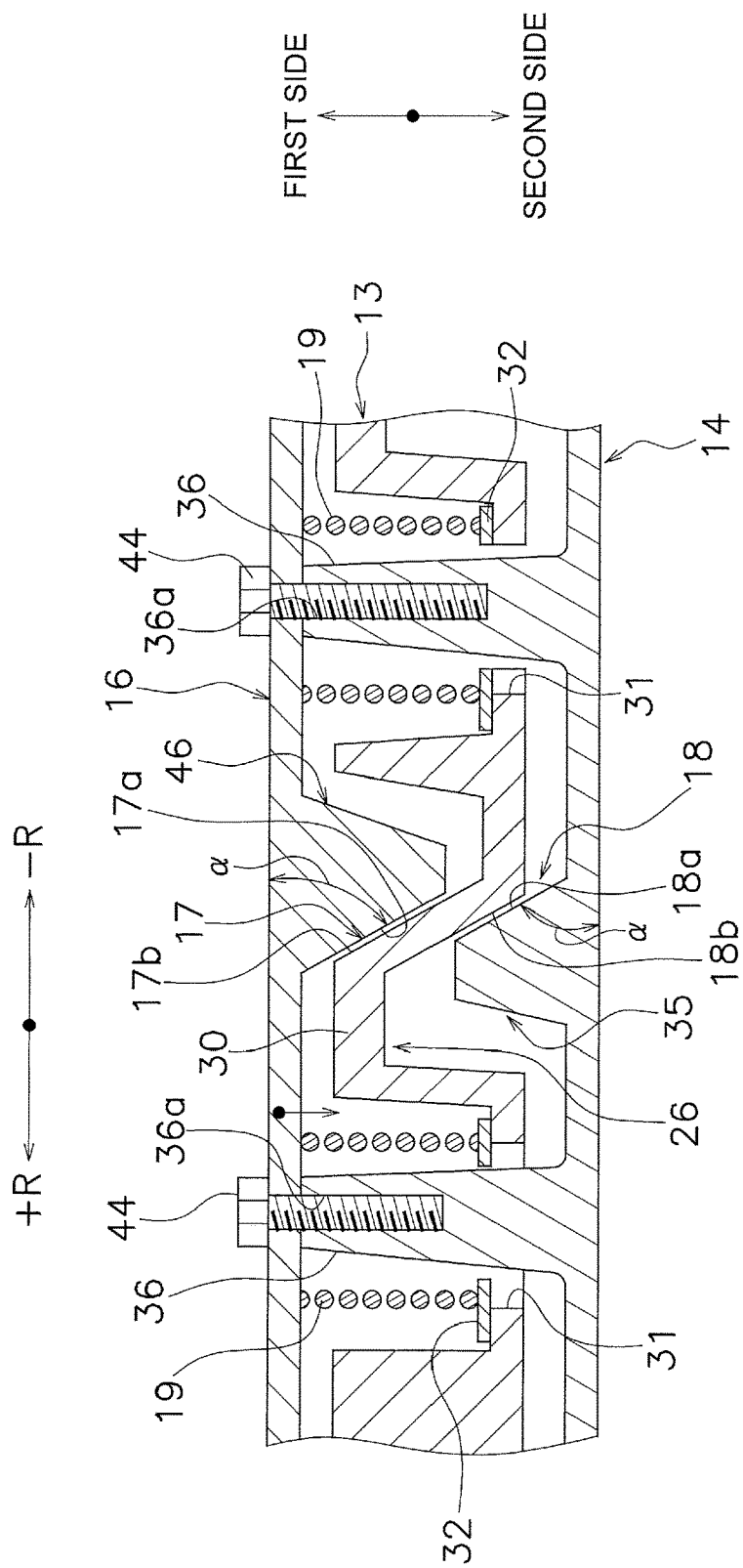
FIG. 6 is a schematic diagram for explaining constructions and actions of cam portions.

FIGS. 2 to 5 show a clutch device 10 for a motorcycle according to a preferred embodiment of the present disclosure. FIG. 2 is an external view of the clutch device 10, whereas FIG. 3 is a cross-sectional view of the clutch device 10. On the other hand, FIGS. 4 and 5 are exploded perspective views of major members. FIG. 2 is shown without illustration of some members (e.g., input-side gear). In the cross-sectional view of FIG. 3, line O-O indicates a rotational axis. On the other hand, FIG. 6 schematically shows a first cam portion and a second cam portion. FIG. 6 is a planar net. It should be noted that in the following explanation, the term "axial direction" refers to an extending direction of the rotational axis O-O. As shown in FIG. 3, the right side in FIG. 3 is defined as "a first side in the axial direction" whereas the left side in FIG. 3 is defined as "a second side in the axial direction".

The clutch device 10 is configured to allow or block transmission of power from an engine to a transmission. The clutch device 10 includes a clutch housing 12, a clutch center 13, a pressure plate 14, a clutch portion 15, a lifter plate 16, a first cam portion 17 and a second cam portion 18. Additionally, the clutch device 10 further includes a plurality of coil springs 19.

Clutch Housing 12

As shown in FIG. 3, the clutch housing 12 includes a disc part 12a and a tubular part 12b, and is coupled to an input gear (not shown in the drawings). The input gear is meshed with a drive gear (not shown in the drawings) fixed to an engine-side crankshaft.

The input gear is coupled to the disc part 12a through a plurality of coil springs (not shown in the drawings). The plural coil springs are provided for absorbing vibration from the engine, and are inserted into holes provided in the input gear.

The tubular part 12b is provided to extend from the outer peripheral edge of the disc part 12a to the first side in the axial direction. The tubular part 12b is provided with a plurality of cutouts 12c extending in the axial direction. The plural cutouts 12c are aligned at predetermined intervals in the circumferential direction.

Clutch Center 13

The clutch center 13 is disposed in the interior of the clutch housing 12, i.e., on the inner peripheral side of the tubular part 12b of the clutch housing 12. The clutch center 13 has an approximately disc shape and includes a boss part 25 provided on its middle part, a disc part 26, a tubular part 27 and a pressure receiving part 28.

The boss part 25 extends to protrude to the second side in the axial direction. The boss part 2 is provided with a spline hole 25a in its middle part. The spline hole 25a extends in the axial direction. An input shaft (not shown in the drawings) of the transmission is engaged with the spline hole 25a. It should be noted that the clutch center 13 is configured not to be moved in the axial direction.

The disc part 26 is provided to extend radially outward from the boss part 25. As shown in FIG. 4, the disc part 26 is provided with three protrusions 30 and three holes 31. Each hole 31 is located between adjacent two of the protrusions 30 in the circumferential direction. Each protrusion 30 is provided to protrude to the first side in the axial direction and includes an internal space. Washers 32 (see FIG. 6) are provided, each of which is disposed on a part about each hole 31 on the axial first side surface of the disc part 26 and supports one end of each coil spring 19.

The tubular part 27 is provided to extend from the outer peripheral region of the disc part 26 to the second side in the axial direction. The tubular part 27 is provided with a plurality of teeth 27a for engagement on its outer peripheral surface.

The pressure receiving part 28 is provided to extend radially outward from the axial end of the tubular part 27. The pressure receiving part 28 has an annular shape and faces to the second side in the axial direction. The pressure receiving part 28 is opposed to the clutch portion 15.

Pressure Plate 14

The pressure plate 14 has an annular shape, and is supported at its inner peripheral surface 14a by the outer peripheral surface of the boss part 25 of the clutch center 13 while being movable in the axial direction. The pressure plate 14 includes three second cam protrusions 35, three fixation protrusions 36 and a pressure applying part 37.

The second cam protrusions 35 are provided on a radially intermediate part of the pressure plate 14 while being aligned in the circumferential direction. The second cam protrusions 35 are provided to protrude to the first side in the axial direction. As shown in FIG. 6, the second cam protrusions 35 are inserted into the internal spaces of the protrusions 30 of the clutch center 13.

Each fixation protrusion 36 is provided between adjacent two of the second cam protrusions 35 in the circumferential direction, while protruding to the first side in the axial direction. Each fixation protrusion 36 extends toward the lifter plate 16 through each hole 31 provided in the disc part 26 of the clutch center 13. Additionally, each fixation protrusion 36 is provided with a screw hole 36a in its center part. The screw hole 36a extends in the axial direction.

The pressure applying part 37 has an annular shape and is provided as the outer peripheral part of the pressure plate 14. The pressure applying part 37 faces to the first side in the axial direction. Additionally, the pressure applying part 37 is disposed at an interval from the pressure receiving part 28 of the clutch center 13 in the axial direction. The clutch portion 15 is disposed between the pressure applying part 37 and the pressure receiving part 28. In other words, the pressure applying part 37, the clutch portion 15 and the pressure receiving part 28 are sequentially aligned in this order from the second side to the first side in the axial direction.

Clutch Portion 15

The clutch portion 15 includes at least one first clutch plate 41 and at least one second clutch plate 42. The first and second clutch plates 41 and 42 are disposed between the pressure receiving part 28 and the pressure applying part 37. Transmission of power is allowed or blocked between the clutch housing 12 and the clutch center 13 through the first and second clutch plates 41 and 42. The both types of clutch plates 41 and 42 have annular shapes and are alternately disposed in the axial direction.

The first clutch plate (or plates) 41 is axially movable with respect to the clutch housing 12, while being non-rotatable relatively thereto. In other words, the first clutch plate (or plates) 41 is configured to be unitarily rotated with the clutch housing 12. When described in detail, each first clutch plate 41 is provided with a plurality of engaging protrusions on its outer peripheral part. The engaging protrusions protrude radially outward therefrom. The engaging protrusions are meshed with the cutouts 12c provided in the tubular part 12b of the clutch housing 12. Friction members are attached to the both surfaces of each first clutch plate 41.

Each second clutch plate 42 is provided with a plurality of engaging protrusions on its inner peripheral end. The engaging protrusions protrude radially inward therefrom. The engaging protrusions are meshed with the teeth 27a for engagement that are provided on the tubular part 27 of the clutch center 13. Therefore, the second clutch plate (or plates) 42 is axially movable with respect to the clutch center 13, while being non-rotatable relatively thereto. In other words, the second clutch plate (or plates) 42 is configured to be unitarily rotated with the clutch center 13.

Lifter Plate 16

The lifter plate 16 is disposed on the first side of the clutch center 13 in the axial direction. The lifter plate 16 is disposed on the tip end surfaces of the fixation protrusions 36 of the pressure plate 14, and is fixed to the pressure plate 14 by bolts 44 screwed into the screw holes 36a of the fixation protrusions 36. The lifter plate 16 has an approximately disc shape and is provided with an opening in its middle part. As shown in FIGS. 4 to 6, the lifter plate 16 is also provided with three first cam protrusions 46 on its outer peripheral part. The first cam protrusions 46 are provided to protrude to the second side in the axial direction. Additionally, a release mechanism (not shown in the drawings) is coupled to the lifter plate 16.

It should be noted that one end surface of each coil spring 19 makes contact with a lateral surface of the lifter plate 16. In other words, each coil spring 19 is disposed between the lifter plate 16 and each washer 32 disposed on the clutch center 13, and urges the lifter plate 16 and the pressure plate 14 fixed to the lifter plate 16 to the first side in the axial direction. When the release mechanism is not being actuated, the clutch portion 15 is configured to be in a clutch-on state (a state in which transmission of power is allowed) by this urging force.

First Cam Portion 17 and Second Cam Portion 18

The first cam portion 17 is disposed between the clutch center 13 and the lifter plate 16 in the axial direction. The first cam portion 17 is a mechanism configured to increase the engaging force of the clutch portion 15 when a forward drive force (positive-side torque) acts on the clutch center 13 and the pressure plate 14. On the other hand, the second cam portion 18 is disposed between the clutch center 13 and the pressure plate 14 in the axial direction. The second cam portion 18 is a mechanism configured to reduce the engaging force of the clutch portion 15 when a reverse drive force (negative-side torque) acts on the clutch center 13 and the pressure plate 14.

<First Cam Portion 17>

As shown in exploded perspective views of FIGS. 4 and 5 and a schematic view of FIG. 6, the first cam portion 17 includes a plurality of first cam surfaces 17a and a plurality of first slopes 17b.

Each first cam surface 17a is provided on each first cam protrusion 46 of the lifter plate 16. Specifically, each first cam protrusion 46 is provided with the first cam surface 17a on one circumferential end surface thereof. Each first cam surface 17a tilts at an angle α with respect to the circumferential direction. It should be noted that the other circumferential end surface of each first cam protrusion 46 tilts oppositely to the tilt direction of the first cam surface 17a with respect to the circumferential direction.

Each first slope 17b is provided on each protrusion 30 of the clutch center 13. Specifically, each protrusion 30 is provided with the first slope 17b on one circumferential end surface thereof. Each first slope 17b tilts in parallel to and at the same angle α as each first cam surface 17a with respect to the circumferential direction. Additionally, each first cam surface 17a is contactable to each first slope 17b.

<Second Cam Portion 18>

As shown in the exploded perspective views of FIGS. 4 and 5 and the schematic view of FIG. 6, the second cam portion 18 includes a plurality of second cam surfaces 18a and a plurality of second slopes 18b.

Each second cam surface 18a is provided on each second cam protrusion 35 of the pressure plate 14. Specifically, each second cam protrusion 35 is provided with the second cam surface 18a on one circumferential end surface thereof. Each second cam surface 18a tilts at an angle −α with respect to the circumferential direction. It should be noted that the other circumferential end surface of each second cam protrusion 35 tilts oppositely to the tilt direction of each second cam surface 18a with respect to the circumferential direction.

Each second slope 18b is provided on each protrusion 30 of the clutch center 13. Specifically, in each protrusion 30, the back surface of the wall on which the first slope 17b is provided (i.e., the surface located on the second side in the axial direction) functions as the second slope 18b. Each second slope 18b tilts in parallel to and at the same angle −α as each second cam surface 18a with respect to the circumferential direction. Additionally, each second cam surface 18a is contactable to each second slope 18b.

Positioning Mechanism

As shown in FIGS. 3 and 4, each of the protrusions 30 provided on the clutch center 13 is provided with an opening 30a in its inner peripheral surface. Additionally, the inner peripheral surface of each second cam protrusion 35 provided on the pressure plate 14 is exposed through the opening 30a to the further inner peripheral side than the inner peripheral surface of each protrusion 30 (second slope). Moreover, each of the three second cam protrusions 35 is provided with a contact surface 35a (see FIG. 4) on the inner peripheral surface of its tip. The contact surfaces 35a of the three second cam protrusions 35 are located on a common imaginary circumferential surface.

On the other hand, as shown in FIGS. 3 to 5, the lifter plate 16 is provided with three positioning parts 48. The positioning parts 48 are respectively provided to protrude from the inner peripheral parts of the first cam protrusions 46 to the second side in the axial direction. Each positioning part 48 is provided with a contact surface 48a on the outer peripheral surface of its tip. The contact surfaces 48a of the positioning parts 48 are located on a common imaginary circumferential surface. Additionally, the contact surfaces 35a of the second cam protrusions 35 make contact with the contact surfaces 48a, whereby the lifter plate 16 is radially positioned with respect to the pressure plate 14.

Actions

When a release operation is not being performed in the clutch device 10, the lifter plate 16 and the clutch center 13 are urged oppositely to each other by the coil springs 19. The clutch center 13 is configured not to be moved in the axial direction. Hence, the lifter plate 16 is moved to the first side in the axial direction. The lifter plate 16 is coupled to the pressure plate 14. Hence, the pressure plate 14 is also moved to the first side in the axial direction. As a result, the clutch portion 15 is turned into a clutch-on state.

In this state, a torque from the engine is inputted into the clutch housing 12 through the input gear, and is then transmitted to the clutch center 13 and the pressure plate 14 through the clutch portion 15.

Next, actions of the first and second cam portions 17 and 18 will be explained in detail.

When a forward drive force acts on the pressure plate 14, in other words, when a positive-side torque acts on the pressure plate 14, the lifter plate 16 fixed to the pressure plate 14 also receives a torque equivalent to the positive-side torque. In this case, the first cam portion 17 is actuated. Specifically, the pressure plate 14 and the lifter plate 16 fixed to the pressure plate 14 are rotated relatively to the clutch center 13 in a +R direction shown in FIG. 6, the first cam surfaces 17a are pressed against the first slopes 17b. The clutch center 13 is herein configured not to be moved in the axial direction. Hence, the first cam surfaces 17*a* are moved along the first slopes 17*b*, and the lifter plate 16 is moved to the first side in the axial direction. Accordingly, the pressure plate 14 coupled to the lifter plate 16 is also moved in the same direction as the lifter plate 16, and the pressure applying part 37 of the pressure plate 14 is moved toward the pressure receiving part 28 of the clutch center 13. As a result, the clutch portion 15 is firmly interposed between and held by the pressure applying part 37 and the pressure receiving part 28. This increases the clutch engaging force.

On the other hand, when a rider returns a throttle grip to reduce acceleration, a reverse drive force acts on the clutch device 10 through the clutch center 13. In this case, the second cam portion 18 is actuated. In other words, the clutch center 13 is rotated relatively to the pressure plate 14 in a +R direction shown in FIG. 6 by a torque from the transmission side. From a reverse point of view, the pressure plate 14 is rotated relatively to the clutch center 13 in a −R direction. With this relative rotation, the second cam surfaces 18*a* and the second slopes 18*b* are pressed against each other. The clutch center 13 is configured not to be moved in the axial direction. Hence, due to this pressing, the second cam surfaces 18*a* are moved along the second slopes 18*b*, and the pressure plate 14 is moved to the second side in the axial direction. As a result, the pressure applying part 37 is moved in a separating direction from the pressure receiving part 28. This reduces the clutch engaging force.

Next, when the rider squeezes a clutch lever, the operating force is transmitted to the release mechanism through a clutch wire and so forth. The lifter plate 16 is moved by the release mechanism against the urging force of the coil springs 19 to the second side in the axial direction. When the lifter plate 16 is moved to the second side in the axial direction, the pressure plate 14 coupled to the lifter plate 16 is also moved to the second side in the axial direction. Accordingly, pressure of the pressure plate 14 onto the clutch portion 15 is released, and the clutch portion 15 is turned into a clutch-off state. In this clutch-off state, rotation from the clutch housing 12 is not transmitted to the clutch center 13.

Other Preferred Embodiments

The present disclosure is not limited to the aforementioned preferred embodiment, and a variety of changes or modifications can be made without departing from the scope of the present disclosure.

(a) In the aforementioned preferred embodiment, each of the lifter plate and the pressure plate is provided with protrusions integrated therewith, and the protrusions compose part of the cam portion. However, at least one of the lifter plate and the pressure plate may be provided with a separate member fixed thereto, and the separate member may be provided with protrusions.

(b) Positional arrangements of the first cam portion and the second cam portion are not limited to those in the aforementioned preferred embodiment. The positional arrangement of the first cam portion and that of the second cam portion may be reversed.

(c) In the aforementioned preferred embodiment, the coil springs are exemplified as urging members. However, disc springs or so forth may be used instead of the coil springs.

What is claimed is:

1. A clutch device for a motorcycle, comprising:
a clutch housing;
a clutch center including a pressure receiving part, the clutch center accommodated inside the clutch housing;
a pressure plate including a pressure applying part, the pressure applying part disposed at an interval from the pressure receiving part in an axial direction;
a clutch portion disposed between the pressure receiving part and the pressure applying part, the clutch portion configured to allow and block transmission of a power between the clutch housing and the clutch center;
a first cam portion disposed on one side of the clutch center in the axial direction, the first cam portion configured to increase an engaging force of the clutch portion when a forward drive force acts on the clutch device, wherein the first cam portion includes the clutch center and a first rotational member, the first rotational member disposed on a first side of the clutch center in the axial direction in opposition to the clutch center, the first rotational member configured to be rotatable relatively to the clutch center; and
a second cam portion disposed on the other side of the clutch center in the axial direction, the second cam portion configured to reduce the engaging force of the clutch portion when a reverse drive force acts on the clutch device, wherein the second cam portion includes the clutch center and a second rotational member, the second rotational member disposed on a second side of the clutch center in the axial direction in opposition to the clutch center, the second rotational member configured to be rotatable relatively to the clutch center, the first rotational member and the second rotational member are separately provided, and the first rotational member and the second rotational member are fixed so as to be non-rotatable relatively to each other and be immovable relatively to each other in the axial direction.

2. The clutch device according to claim 1, wherein
the pressure plate is disposed between the clutch housing and the clutch center in the axial direction,
the clutch device further comprises a lifter member, the lifter member disposed in opposition to the clutch housing while the pressure plate and the clutch center are interposed between the lifter member and the clutch housing, the lifter member fixed to the pressure plate,
the first cam portion is provided between the clutch center and the lifter member, and
the second cam portion is provided between the clutch center and the pressure plate.

3. The clutch device according to claim 2, wherein
the first cam portion is configured to move the pressure plate through the lifter member in the axial direction such that the pressure applying part of the pressure plate approaches to the pressure receiving part of the clutch center when the pressure plate is rotated relatively to the clutch center in a first rotational direction, and
the second cam portion is configured to move the pressure plate in the axial direction such that the pressure applying part of the pressure plate separates from the pressure receiving part of the clutch center when the pressure plate is rotated relatively to the clutch center in a second rotational direction.

4. The clutch device according to claim 2, wherein
the lifter member is provided with a first protrusion, the first protrusion integrated with the lifter member, the first protrusion protruding toward the clutch center, and
the first cam portion includes a first cam surface, the first cam surface provided on an end surface of the first protrusion in a circumferential direction, the first cam surface tilting with respect to the circumferential direction.

5. The clutch device according to claim 4, wherein the first cam portion includes a first slope, the first slope provided on the clutch center, the first slope tilting in parallel to the first cam surface with respect to the circumferential direction, the first slope making contact with the first cam surface.

6. The clutch device according to claim 2, wherein
the pressure plate is provided with a second protrusion, the second protrusion integrated with the pressure plate, the second protrusion protruding toward the clutch center, and
the second cam portion includes a second cam surface, the second cam surface provided on an end surface of the second protrusion in a circumferential direction, the second cam surface tilting with respect to the circumferential direction.

7. The clutch device according to claim 6, wherein the second cam portion includes a second slope, the second slope provided on the clutch center, the second slope tilting in parallel to the second cam surface with respect to the circumferential direction, the second slope making contact with the second cam surface.

8. The clutch device according to claim 7, wherein
the second protrusion is exposed at an inner peripheral surface thereof through an inner peripheral surface of the second slope of the clutch center to a further inner peripheral side than the inner peripheral surface of the second slope of the clutch center, and
the lifter member is provided with a positioning part, the positioning part protruding toward the clutch center while making contact at an outer peripheral surface thereof with the inner peripheral surface of the second protrusion so as to enable positioning of the lifter member in a radial direction.

9. The clutch device according to claim 2, wherein
the clutch portion includes a plurality of clutch plates configured to be pressed against each other,
the clutch device further comprises an urging member for pressing the plurality of clutch plates against each other, and
the lifter member is a release member.

10. A clutch device for a motorcycle, comprising:
a clutch housing;
a clutch center including a pressure receiving part, the clutch center accommodated inside the clutch housing;
a pressure plate including a pressure applying part, the pressure applying part disposed at an interval from the pressure receiving part in an axial direction;
a clutch portion disposed between the pressure receiving part and the pressure applying part, the clutch portion configured to allow and block transmission of a power between the clutch housing and the clutch center;
a first cam portion configured to increase an engaging force of the clutch portion when a forward drive force acts on the clutch center and the pressure plate, wherein the first cam portion includes the clutch center and a first rotational member, the first rotational member disposed on a first side of the clutch center in the axial direction in opposition to the clutch center, the first rotational member configured to be rotatable relatively to the clutch center; and
a second cam portion configured to reduce the engaging force of the clutch portion when a reverse drive force acts on the clutch center and the pressure plate, wherein the second cam portion includes the clutch center and a second rotational member, the second rotational member disposed on a second side of the clutch center in the axial direction in opposition to the clutch center, the second rotational member configured to be rotatable relatively to the clutch center, the first rotational member and the second rotational member are separately provided, and the first rotational member and the second rotational member are fixed so as to be non-rotatable relatively to each other and be immovable relatively to each other in the axial direction.

* * * * *